(12) United States Patent  
Zedelmair et al.

(10) Patent No.: US 11,549,644 B2  
(45) Date of Patent: Jan. 10, 2023

(54) APPARATUS AND METHOD FOR MAKING INTERNALLY FINNED PRESSURE VESSEL

(71) Applicant: Seatrec, Inc., Monrovia, CA (US)

(72) Inventors: Michael Zedelmair, Monrovia, CA (US); David Fratantoni, Monrovia, CA (US); Yi Chao, Monrovia, CA (US); Robin Willis, Monrovia, CA (US)

(73) Assignee: Seatrec, Inc., Vista, CA (US)

( * ) Notice: Subject to any disclaimer, the term of this patent is extended or adjusted under 35 U.S.C. 154(b) by 540 days.

(21) Appl. No.: 16/694,860

(22) Filed: Nov. 25, 2019

(65) Prior Publication Data

US 2021/0010639 A1    Jan. 14, 2021

Related U.S. Application Data

(60) Provisional application No. 62/872,059, filed on Jul. 9, 2019.

(51) Int. Cl.

| | |
|---|---|
| *B23K 3/08* | (2006.01) |
| *F17C 1/14* | (2006.01) |
| *F17C 13/06* | (2006.01) |
| *F17C 13/00* | (2006.01) |
| B23K 101/08 | (2006.01) |
| B23K 101/12 | (2006.01) |
| B25B 11/02 | (2006.01) |
| B23Q 3/00 | (2006.01) |
| B25B 11/00 | (2006.01) |

(52) U.S. Cl.
CPC .............. *F17C 1/14* (2013.01); *B23K 3/087* (2013.01); *F17C 13/002* (2013.01); *F17C 13/06* (2013.01); *B23K 2101/08* (2018.08); *B23K 2101/12* (2018.08); *B23Q 3/00* (2013.01); *B25B 11/002* (2013.01); *B25B 11/02* (2013.01); *F17C 2209/22* (2013.01); *F17C 2209/221* (2013.01); *Y10T 29/53961* (2015.01)

(58) Field of Classification Search
None  
See application file for complete search history.

(56) References Cited

U.S. PATENT DOCUMENTS

| | | | | |
|---|---|---|---|---|
| 2,473,633 A | * | 6/1949 | Brown, Jr. | ......... B23K 11/0046 219/107 |
| 2,483,454 A | | 10/1949 | Brown, Jr. | |
| 2,550,965 A | * | 5/1951 | Brown, Jr. | ......... B23K 11/0046 219/81 |

(Continued)

*Primary Examiner* — Devang R Patel  
(74) *Attorney, Agent, or Firm* — Stetina Brunda Garred and Brucker (57) ABSTRACT

An apparatus for fabricating an internally finned pressure vessel includes a plurality of positioning discs, each of the positioning discs defining a plurality of circumferentially spaced slots extending radially into the positioning disc from a perimeter thereof, and one or more rods extending through the plurality of positioning discs, the plurality of positioning discs being held in axial alignment by the one or more rods. A method of fabricating the internally finned pressure vessel includes providing the apparatus, loading a plurality of fins into the slots of the positioning discs, inserting the apparatus containing the plurality of fins into a pressure vessel, attaching the plurality of fins to the pressure vessel by a brazing process, and removing the apparatus from the pressure vessel.

11 Claims, 6 Drawing Sheets

(56) References Cited

U.S. PATENT DOCUMENTS

| | | | |
|---|---|---|---|
| 2,703,921 A * | 3/1955 | Brown, Jr. | F28D 7/106 |
| | | | 29/890.036 |
| 2,726,681 A * | 12/1955 | Gaddis | F28F 1/40 |
| | | | 138/38 |
| 2,731,709 A | 1/1956 | Gaddis et al. | |
| 2,929,408 A | 3/1960 | Weatherwax et al. | |
| 2,930,405 A * | 3/1960 | Welsh | F22D 1/02 |
| | | | 138/38 |
| 3,267,563 A | 8/1966 | Seaton | |
| 3,267,564 A | 8/1966 | Keyes | |
| 3,394,736 A | 7/1968 | Pearson | |
| 3,831,247 A * | 8/1974 | Degroute | F28F 1/105 |
| | | | 29/890.036 |
| 3,995,805 A * | 12/1976 | Gersbacher | B23K 3/087 |
| | | | 269/236 |
| 4,154,296 A | 5/1979 | Fijas | |
| 4,163,474 A * | 8/1979 | MacDonald | F28F 1/40 |
| | | | 165/DIG. 519 |
| 5,275,234 A | 1/1994 | Booth | |
| 5,655,599 A | 8/1997 | Kasprzyk | |
| 6,164,370 A | 12/2000 | Robinson et al. | |
| 6,533,030 B2 | 3/2003 | Mitrovic et al. | |
| 7,181,929 B2 | 2/2007 | Watanabe | |
| 7,987,674 B2 | 8/2011 | Jones et al. | |
| 3,091,615 A1 | 1/2012 | Houfuku et al. | |
| 2018/0172361 A1 | 6/2018 | Basini | |

\* cited by examiner

APPARATUS AND METHOD FOR MAKING INTERNALLY FINNED PRESSURE VESSEL

CROSS-REFERENCE TO RELATED APPLICATIONS

This application relates to and claims the benefit of U.S. Provisional Application No. 62/872,059, filed Jul. 9, 2019 and entitled "INTERNALLY FINNED HIGH-PRESSURE VESSEL AND METHOD OF FORMING THE SAME," the entire disclosure of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to thermal energy conversion and, more particularly, to pressure vessels for storing or transporting fluids.

2. Related Art

In a thermal energy conversion engine, energy in the form of heat must be removed or added to a fluid stored at high pressure. The typical shape of a container to store or transport fluids at high pressure is spherical or cylindrical. Since liquids and gases generally have much lower thermal conductivity than solid materials, the distance that heat must travel in the fluid must be reduced to maximize heat transfer efficiency. The structural integrity of the vessel containing the fluids at high pressure must not be impacted by the heat transfer enhancement.

BRIEF SUMMARY

The present disclosure contemplates various apparatuses and methods for overcoming the above challenges accompanying the related art. One aspect of the embodiments of the disclosure is an apparatus for fabricating an internally finned pressure vessel. The apparatus may include a plurality of positioning discs, each of the positioning discs defining a plurality of circumferentially spaced slots extending radially into the positioning disc from a perimeter thereof, and one or more rods extending through the plurality of positioning discs, the plurality of positioning discs being held in axial alignment by the one or more rods.

The positioning discs may be made of stainless steel or a nickel-chromium based alloy.

The apparatus may include a pair of biasing discs, one on either side of the plurality of positioning discs and held in axial alignment therewith by the one or more rods, each of the biasing discs defining a plurality of circumferentially spaced slots extending radially into the biasing disc from a perimeter thereof, the slots of the biasing discs terminating farther than the slots of the positioning discs from an axis defined by the axial alignment of the plurality of positioning discs. The biasing discs may be made of rubber.

The one or more rods may comprise a center rod at an axis defined by the axial alignment of the plurality of positioning discs. The apparatus may include a pair of leveling discs, one on either side of the plurality of positioning discs and held in axial alignment therewith by the center rod, each of the leveling discs defining a surface that overlaps the slots of the positioning discs. The leveling discs may be made of stainless steel. The one or more rods may comprise at least one off-axis rod parallel to the center rod. The positioning discs may be fixed to the at least one off-axis rod with the center rod being movable relative thereto along the axis. The positioning discs may be fixed to the at least one off-axis rod by a plurality of nuts threadably connected to the at least one off-axis rod. The at least one off-axis rod may be made of stainless steel or a nickel-chromium based alloy.

Another aspect of the embodiments of the disclosure is a method of fabricating an internally finned pressure vessel. The method may include providing an apparatus including a plurality of positioning discs, each of the positioning discs defining a plurality of circumferentially spaced slots extending radially into the positioning disc from a perimeter thereof, the apparatus further including one or more rods extending through the plurality of positioning discs, the plurality of positioning discs being held in axial alignment by the one or more rods. The method may further include loading a plurality of fins into the slots of the positioning discs, inserting the apparatus containing the plurality of fins into a pressure vessel, attaching the plurality of fins to the pressure vessel by a brazing process, and removing the apparatus from the pressure vessel.

The positioning discs may be made of stainless steel or a nickel-chromium based alloy.

The fins may be made of aluminum.

The apparatus may include a pair of biasing discs, one on either side of the plurality of positioning discs and held in axial alignment therewith by the one or more rods, each of the biasing discs defining a plurality of circumferentially spaced slots extending radially into the biasing disc from a perimeter thereof, the slots of the biasing discs terminating farther than the slots of the positioning discs from an axis defined by the axial alignment of the plurality of positioning discs. The method may include tack welding the plurality of fins to the pressure vessel after the inserting of the apparatus containing the plurality of fins into the pressure vessel and, thereafter, removing the pair of biasing discs prior to the attaching of the plurality of fins to the pressure vessel by the brazing process. The biasing discs may be made of rubber.

The one or more rods may comprise a center rod at an axis defined by the axial alignment of the plurality of positioning discs. The apparatus may include a pair of leveling discs, one on either side of the plurality of positioning discs and held in axial alignment therewith by the center rod, each of the leveling discs defining a surface that overlaps the slots of the positioning discs. The method may include abutting the plurality of fins against the surface of a first leveling disc of the pair of leveling discs and, while the fins are abutted against the surface of the first leveling disc, abutting the plurality of fins against the surface of a second leveling disc of the pair of leveling discs. The abutting of the plurality of fins against the surface of the second leveling disc may include moving the second leveling disc along the axis relative to the center rod. The leveling discs may be made of stainless steel.

The method may include welding a pair of end caps to the pressure vessel, one on either side of the plurality of fins. The end caps may be made of aluminum.

Another aspect of the embodiments of the disclosure is a method of fabricating a plurality of internally finned pressure vessels. The method may include providing an apparatus including a plurality of positioning discs, each of the positioning discs defining a plurality of circumferentially spaced slots extending radially into the positioning disc from a perimeter thereof, the apparatus further including one or more rods extending through the plurality of positioning discs, the plurality of positioning discs being held in axial alignment by the one or more rods. The method may further include loading a plurality of fins into the slots of the positioning discs, inserting the apparatus containing the plurality of fins into a pressure vessel, attaching the plurality of fins to the pressure vessel by a brazing process, removing the apparatus from the pressure vessel, loading a new plurality of fins into the slots of the positioning discs, inserting the apparatus containing the new plurality of fins into a new pressure vessel, and attaching the new plurality of fins to the new pressure vessel by a brazing process.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various apparatuses and methods for fabricating an internally finned pressure vessel. The detailed description set forth below in connection with the appended drawings is intended as a description of several currently contemplated embodiments. It is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
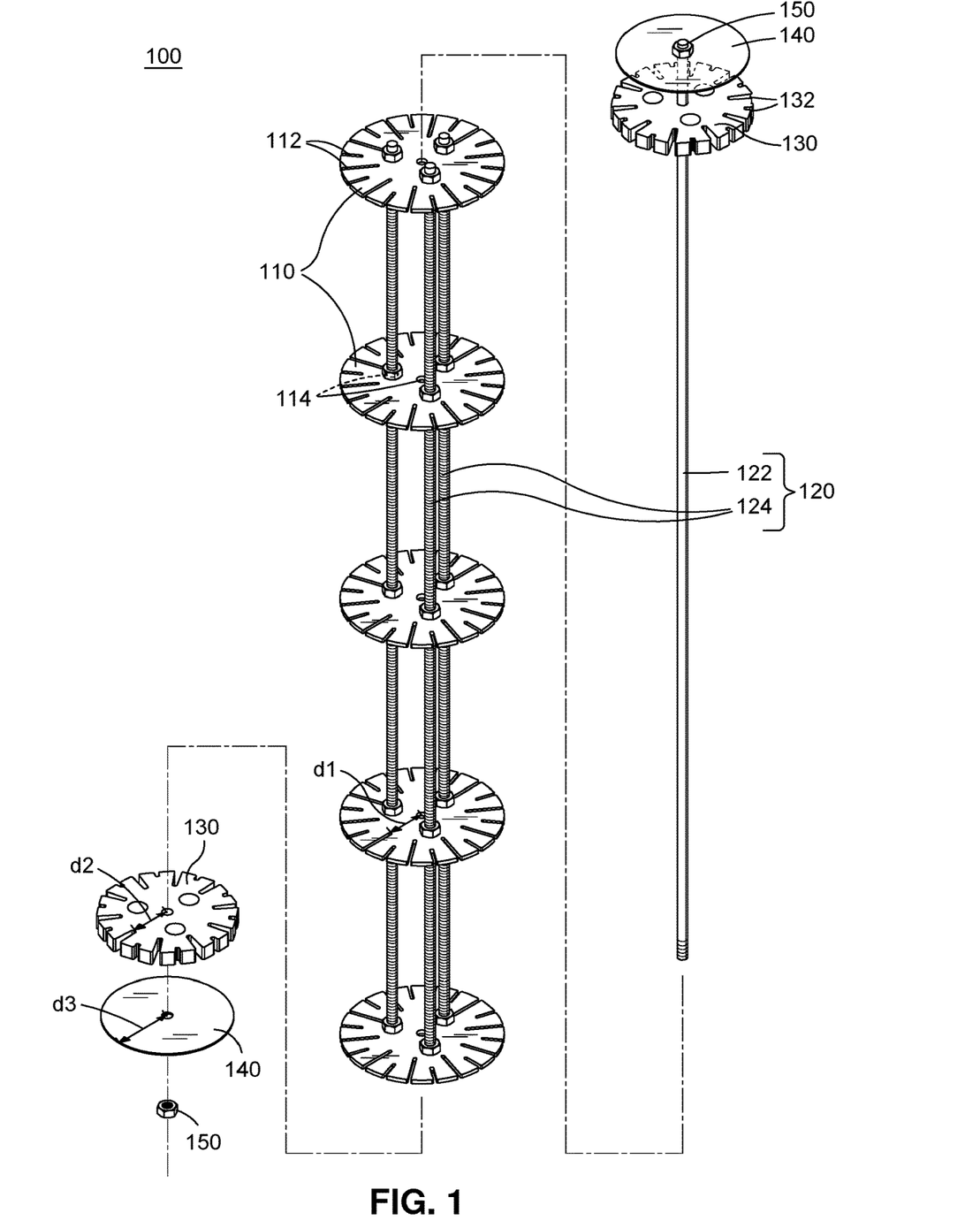
FIG. 1 is a partially exploded perspective view of an apparatus according to an embodiment of the present disclosure.

FIG. 1 is a partially exploded perspective view of an apparatus 100 according to an embodiment of the present disclosure. The apparatus 100 may be used for fabricating an internally finned pressure vessel (see FIGS. 10-12), which may be used to store or transport a fluid at high pressure such as a working fluid of a thermal energy conversion system. Unlike more typical constructions in which the fins of the pressure vessel are located externally, an internally finned pressure vessel may improve the heat transfer rate from the exterior of a thermally conductive pressure vessel to a fluid of low thermal conductivity contained within. When fabricating such an internally finned pressure vessel, attachment of the fins to the interior of a tube by drilling or welding through the tube from the outside may compromise the integrity of the vessel and is impractical, especially considering that the fins must be as thin as possible in order to add minimum weight and to maximize void space in the vessel for the working fluid. By positioning the fins on the interior of the vessel for brazing, the apparatus 100 may avoid such difficulties, allowing for the production of an internally finned pressure vessel having high structural integrity with minimal weight and obstruction to fluid flow in radial and/or axial directions.

As shown in FIG. 1, the apparatus 100 may include a plurality of positioning discs 110, each of the positioning discs 110 defining a plurality of circumferentially spaced slots 112 extending radially into the positioning disc 110 from a perimeter thereof. In the example of FIG. 1, five positioning discs 110 are shown, but fewer or more positioning discs 110 may be used, depending on the length of the internally finned pressure vessel to be produced. The positioning discs 110 may be made of stainless steel or a nickel-chromium based alloy (e.g. Inconel) in order to withstand brazing temperatures. The apparatus 100 may additionally include one or more rods 120 extending through the plurality of positioning discs 110 and holding them in axial alignment, a pair of biasing discs 130, and a pair of leveling discs 140. In general, the positioning discs 110 and associated rod(s) 120 may be thought of as constituting a brazing jig used in the brazing process, while the biasing discs 130, leveling discs 140, and associated rod(s) 120 may be thought of as constituting a separate tack welding jig used prior to the brazing process as described below. In this respect, the one or more rods 120 may include a center rod 122 that is associated with the tack welding jig and one or more off-axis rods 124 that are associated with the brazing jig and extend parallel to the center rod 122.

Figure 2:
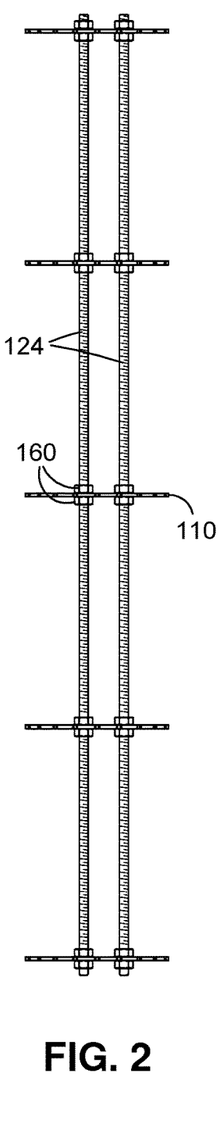
FIG. 2 is a side view of a brazing jig of the apparatus.

FIG. 2 is a side view of the brazing jig. As shown, the positioning discs 110 may be fixed to the rod(s) 124 by a plurality of nuts 160 threadably connected to the rod(s) 124. For example, the rod(s) 124 may be threaded to allow the nuts 160 to be traversed up and down their length, and each of the positioning discs 110 may be fixed to the rod(s) 124 by positioning the nuts 160 on either side of the positioning disc 110. To change the longitudinal position of the positioning discs 110 along the rod(s) 124 (e.g. to change the spacing between positioning discs 110), one may loosen the nuts 160, freely slide the positioning disc 110 along the rod(s) 124, and re-tighten the nuts 160 around the positioning disc 110 at the desired longitudinal position. In this regard, the positioning discs 110 may each define one or more holes 114 through which the rod(s) 120 extend (see FIG. 1, in which central holes 114 are visible and off-axis holes 114 are obscured by nuts 160).

Figure 3:
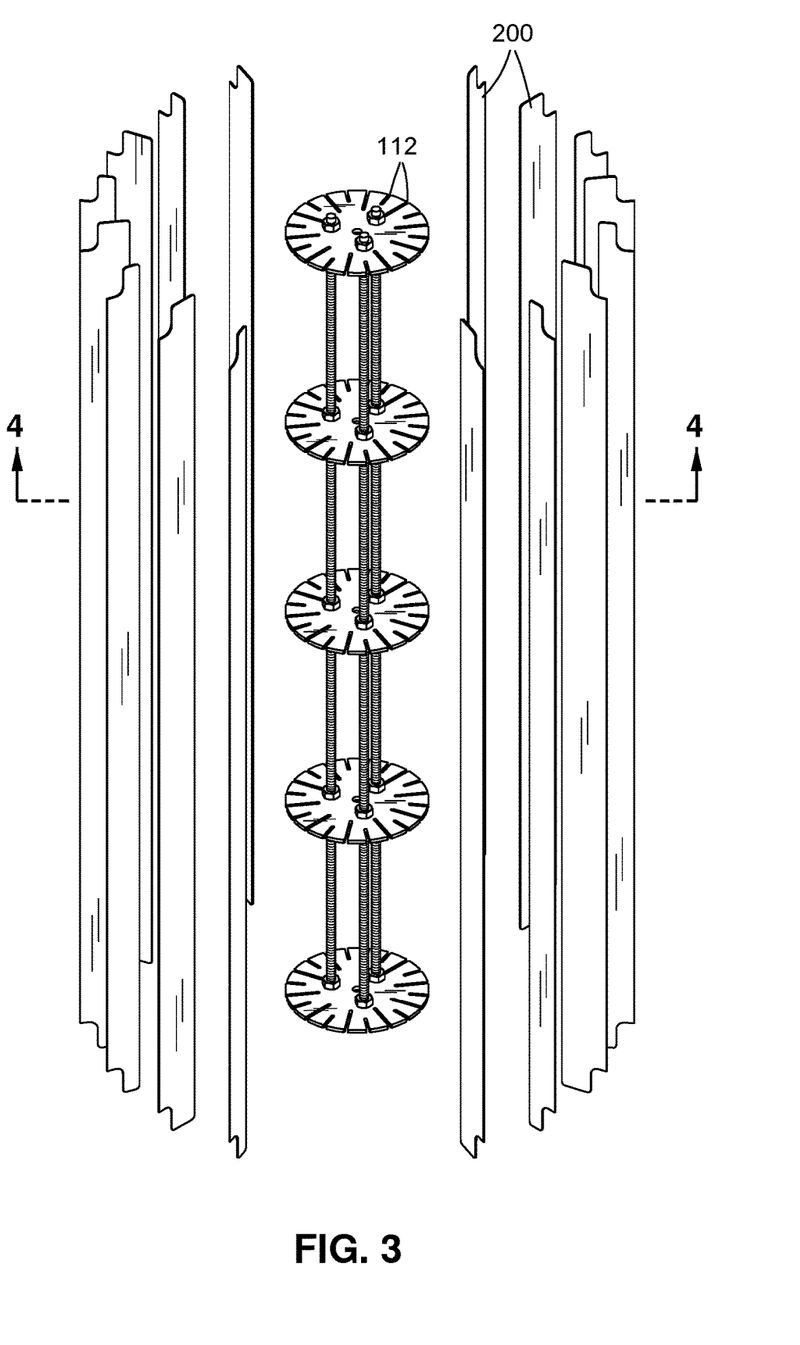
FIG. 3 is a perspective view of the brazing jig together with a plurality of fins.
Figure 4:
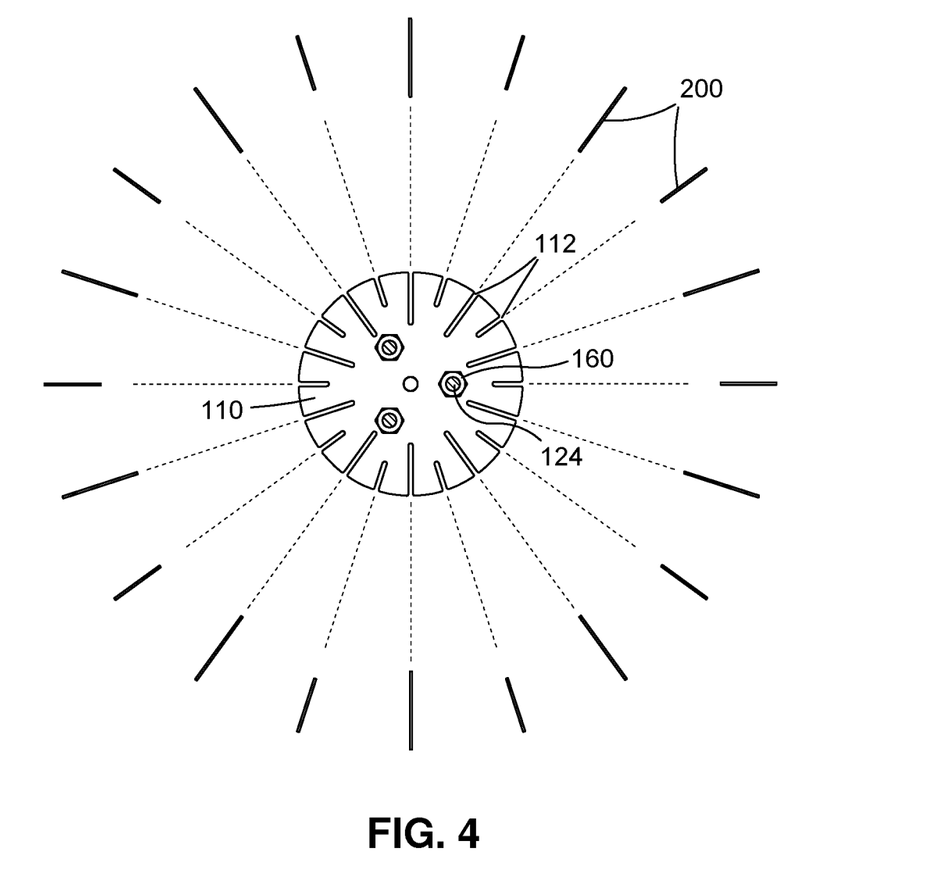
FIG. 4 is a cross-sectional view taken along line 4-4 in FIG. 3.

FIG. 3 is a perspective view of the brazing jig together with a plurality of fins 200. FIG. 4 is a cross-sectional view taken along line 4-4 in FIG. 3. As shown in FIGS. 3 and 4, a method of fabricating an internally finned pressure vessel may include loading a plurality of fins 200 into the slots 112 of the positioning discs 110. Twenty fins 200 are shown, with four of the fins 200 omitted in FIG. 3 in order to more clearly show the brazing jig. Correspondingly, each of the positioning discs 110 has twenty slots 112. However, any number of fins 200 and slots 112 is contemplated, depending on the heat transfer needs of the internally finned pressure vessel to be fabricated. Each positioning disc 110 may be arranged such that its slots 112 are aligned with corresponding slots 112 of the other positioning discs 110 as shown. As such, each fin 200 may be held by a set of corresponding slots 112, one per positioning disc 110. The fins 200 may be made of aluminum or another material that can be attached to the interior of the pressure vessel by brazing. In the example shown, the fins 200 are all the same length but alternate between two widths, and the slots 112 correspondingly alternate between two radial depths into the positioning discs 110. In the case of an internally finned pressure vessel having a circular cross-section as shown, the use of alternating fin widths and slot depths may allow for an increased number of fins 200 while maintaining a desired minimum distance between the fins 200. However, other constructions are possible as well, including those with only a single fin width and single slot depth.

Figure 5:
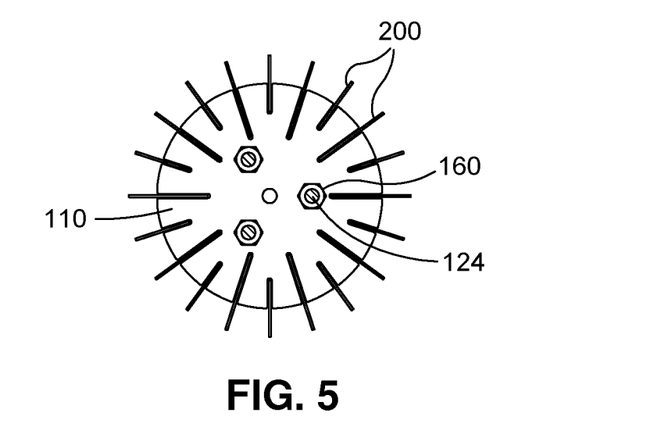
FIG. 5 is the same view as FIG. 4 but with the plurality of fins having been inserted into the brazing jig.
Figure 6:
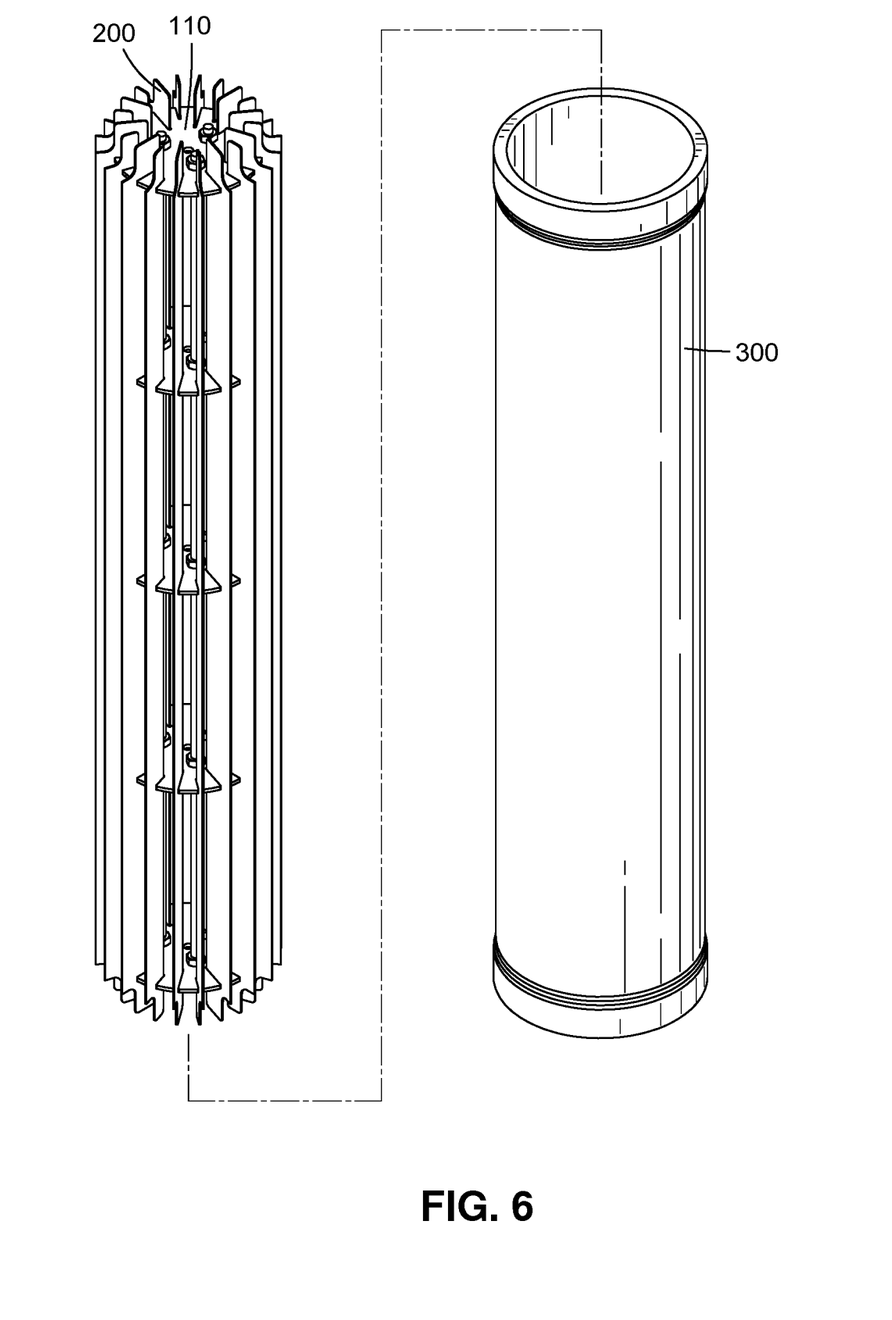
FIG. 6 is a perspective view of the brazing jig and fins together with a pressure vessel.

FIG. 5 is the same view as FIG. 4 but with the plurality of fins 200 having been inserted into the brazing jig. FIG. 6 is a perspective view of the brazing jig and fins 200 together with a pressure vessel 300 (e.g. a tube). Prior to insertion into the pressure vessel 300, the fins 200 may be prevented from falling out of the slots 112 by various means including, for example, a press fit between the fins 200 and the slots 112 (i.e. friction between the fins 200 and the walls of the slots 112) or a temporary wrapping or tie circumferentially surrounding the brazing jig with the fins 200 loaded therein. Alternatively, the brazing jig may be arranged vertically so that the fins 200 may be stood upright as shown in FIG. 6 or slightly inclined toward the brazing jig to be held in the slots 112 by the force of gravity, with the pressure vessel 300 subsequently brought down over the top of the brazing jig and fins 200. In this way, the pressure vessel 300 itself may serve to hold the fins 200 within the slots 112. The brazing jig containing the fins 200 may thus be inserted into the pressure vessel 300.

Figures 7, 8, 9:
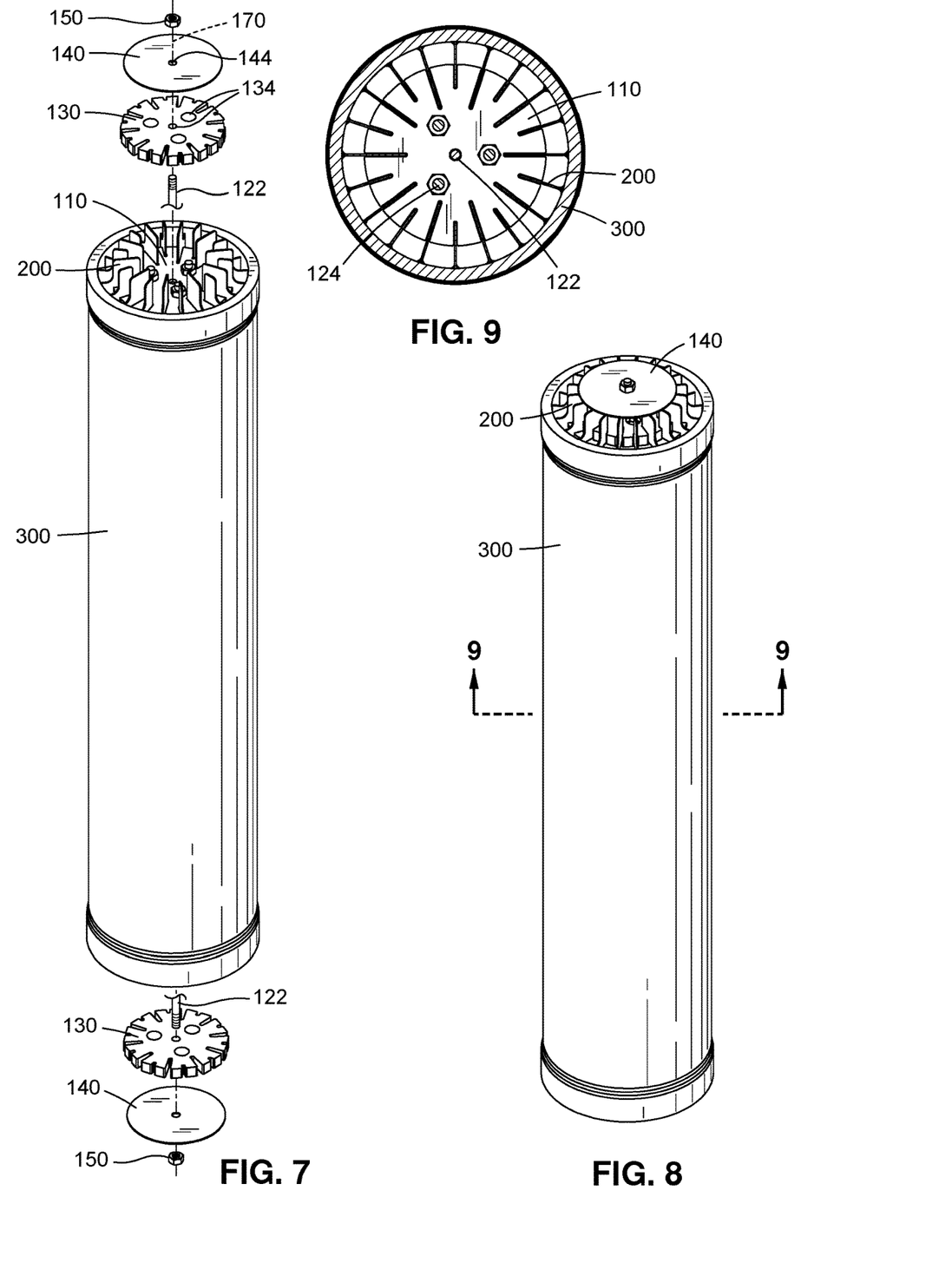
FIG. 7 is a perspective view of the pressure vessel with the brazing jig and fins inserted therein and a tack welding jig of the apparatus shown in exploded view.
FIG. 8 is a perspective view of the pressure vessel with the apparatus including the brazing jig and the tack welding jig inserted therein together with the fins.
FIG. 9 is a cross-sectional view taken along line 9-9 in FIG. 8.

FIG. 7 is a perspective view of the pressure vessel 300 with the brazing jig and fins 200 inserted therein and a tack welding jig of the apparatus 100 shown in exploded view. As explained above, the tack welding jig may include the biasing discs 130, leveling discs 140, and associated rod(s) 120 (e.g. the center rod 122) of the apparatus 100. Similar to the positioning discs 110 of the apparatus 100, each of the biasing discs 130 may define a plurality of circumferentially spaced slots 132 extending radially into the biasing disc 130 from a perimeter thereof. Each biasing disc 130 may be arranged such that its slots 132 are aligned with corresponding slots 112 of the positioning discs 110. In a case where the slots 112 of the positioning discs 110 have alternating slot depths as described above and shown, the corresponding slots 132 of the biasing discs 130 may likewise have alternating slot depths corresponding thereto.

The slots 132 of the biasing discs 130 may terminate farther than the corresponding slots 112 of the positioning discs 110 from the axis 170 defined by the axial alignment of the plurality of positioning discs 110. For example, a distance d2 (see FIG. 1) between a given slot 132 of a biasing disc 132 and the center of the biasing disc 132 may be greater than a distance d1 between a corresponding slot 112 of a positioning disc 110 and the center of the positioning disc 110. Due to the slots 132 of the biasing discs 130 terminating at a greater distance d1 from the axis 170 than the corresponding slots 112 of the positioning discs 110, the biasing discs 130 may apply a biasing force on the fins 200 tending to push the fins 200 outward against the interior wall of the pressure vessel 300. In this way, a close contact between the fins 200 and the pressure vessel 300 can be achieved. The biasing discs 130 may be made of rubber or another material with sufficient elasticity to allow the fins 200 to be fitted in the slots 132 within the pressure vessel 300 against such biasing force.

With the brazing jig and fins 200 inserted in the pressure vessel 300 as shown in FIG. 7, the fabrication of the internally finned pressure vessel may continue with placing the pair of biasing discs 130 one on either side of the plurality of positioning discs 110 of the brazing jig. To this end, similar to the positioning discs 110, the biasing discs 130 may each define one or more holes 134 through which the rod(s) 120 extend. Because the biasing discs 130 will not be used to position the fins 200 during brazing, the biasing discs 130 may simply lie flat against the outermost positioning discs 110. The off-axis hole(s) 134 of the biasing discs 130 may be large enough to receive the outermost nuts 160 in addition to the off-axis rod(s) 124 as they protrude from the outer-most positioning discs 110. The off-axis rod(s) 124 need not extend beyond the biasing discs 130 and may in some cases terminate just after the outermost positioning discs 110 upon entering the biasing discs 130. As noted above, the elasticity of the biasing discs 130 may make it possible to fit the slots 132 of the biasing discs 130 around the fins 200 even though the slots 132 may terminate farther from the axis 170 than the slots of 112 of the positioning discs 110. In this way, the biasing discs 130 may be used to tightly hold the fins 200 against the interior wall of the pressure vessel 300 for a tack welding process as described below and may thereafter be removed for the subsequent brazing process.

The center rod 122 of the tack welding jig may be passed all the way through the brazing jig through the center holes 114 of the positioning discs 110 and, if biasing discs 130 are used, through the center holes 134 of the biasing discs 130 on either end thereof, allowing free movement of the center rod 122 relative to the positioning discs 110, biasing discs 130, and off-axis rod(s) 124. The fabrication of the internally finned pressure vessel may continue with placing the pair of leveling discs 140 on the ends of the center rod 122. The leveling discs 140, which may be made of stainless steel or aluminum for example, may each define a surface that overlaps the slots 112 of the positioning discs 110 and, if the biasing discs 130 are used, overlaps the slots 132 of the biasing discs 130 as well. For example, a radius d3 (see FIG. 1) of the leveling discs 140 may be greater than the distance from center to slot of any of the slots 112, 132 of the positioning discs 110 and biasing discs 130. In particular, the surface of each of the leveling discs 140 may prevent longitudinal movement of the fins 200 past the leveling disc 140. The leveling discs 140 may thus be used to ensure alignment of the fins 200 in the longitudinal direction of the pressure vessel 300 prior to brazing (or prior to tack welding). For example, the plurality of fins 200 may first be abutted against the surface of one of the leveling discs 140 (e.g. the bottom leveling disc 140 in FIG. 7), which may be fixed to the center rod 122 by a nut 150. While the fins 200 are abutted against the surface of the one leveling disc 140, the other leveling disc 140 (e.g. the top leveling disc) may be moved along the axis 170 relative to the center rod 122, for example, by sliding the leveling disc 140 down until it abuts the fins 200 and fixing the leveling disc 140 at the new position with another nut 150. To this end, the leveling discs 140 may each define a center hole 144 through which the rod 122 extends and the ends of the center rod 122 may be threaded as shown in FIG. 7 (or alternatively the entire center rod 122 may be threaded).

FIG. 8 is a perspective view of the pressure vessel 300 with the entire apparatus 100 including the brazing jig and tack welding jig inserted therein together with the fins 200. FIG. 9 is a cross-sectional view taken along line 9-9 in FIG. 8. With the fins 200 sandwiched by the leveling discs 140 of the tack welding jig as described above, it can be ensured that the fins 200 are longitudinally aligned relative to each other in the brazing jig. Meanwhile, a close contact between the fins 200 and the pressure vessel 300 can be ensured by outward force applied by the biasing discs 130 (partially obscured in FIG. 8). The method of fabricating the internally finned pressure vessel may thus proceed with tack welding the plurality of fins 200 to the pressure vessel 300. For example, on both ends of the pressure vessel 300, a tack weld of, e.g., less than one inch may be made to hold each of the fins 200 to the interior wall of the pressure vessel 300. The tack weld will serve to temporarily hold each of the fins 200 in the pressure vessel 300 in the desired position as established by the positioning discs 110 and as fine-tuned by the biasing discs 130 and leveling discs 140.

Once each of the fins 200 has been tack welded on both ends, the tack welding jig may be removed from the pressure vessel 300. In particular, the nuts 150, leveling discs 140, biasing discs 130, and center rod 122 may be removed. The brazing jig containing the fins 200 that are now tack welded to the pressure vessel 300 may remain in the pressure vessel 300. Thereafter, the plurality of fins 200 may be attached to the pressure vessel 300 by the brazing process. For example, a filler metal (e.g. 88% aluminum and 12% silicon) may be applied to the root of the fins 200 either in the form of a paste or a wire. The entire pressure vessel 300 with fins 200 and brazing jig (e.g. positioning discs 110, rods 124, and nuts 160) may be preheated in an air furnace and subsequently immersed in a bath of molten salt to melt the filler metal and bond the fins 200 to the vessel 300. As noted above, the positioning discs 110, rods 124, and nuts 160 may be made of stainless steel or a nickel-chromium based alloy (e.g. Inconel) so that brazing of the fins 200 to the brazing jig may be avoided. However, various other combinations of materials may be used with appropriate control of the brazing temperature. By leaving the brazing jig in the pressure vessel 300 during the brazing process, excessive warpage of the fins 200 may be prevented. After the brazing process is complete, the brazing jig may be removed from the pressure vessel 300.

Figures 10, 11, 12:
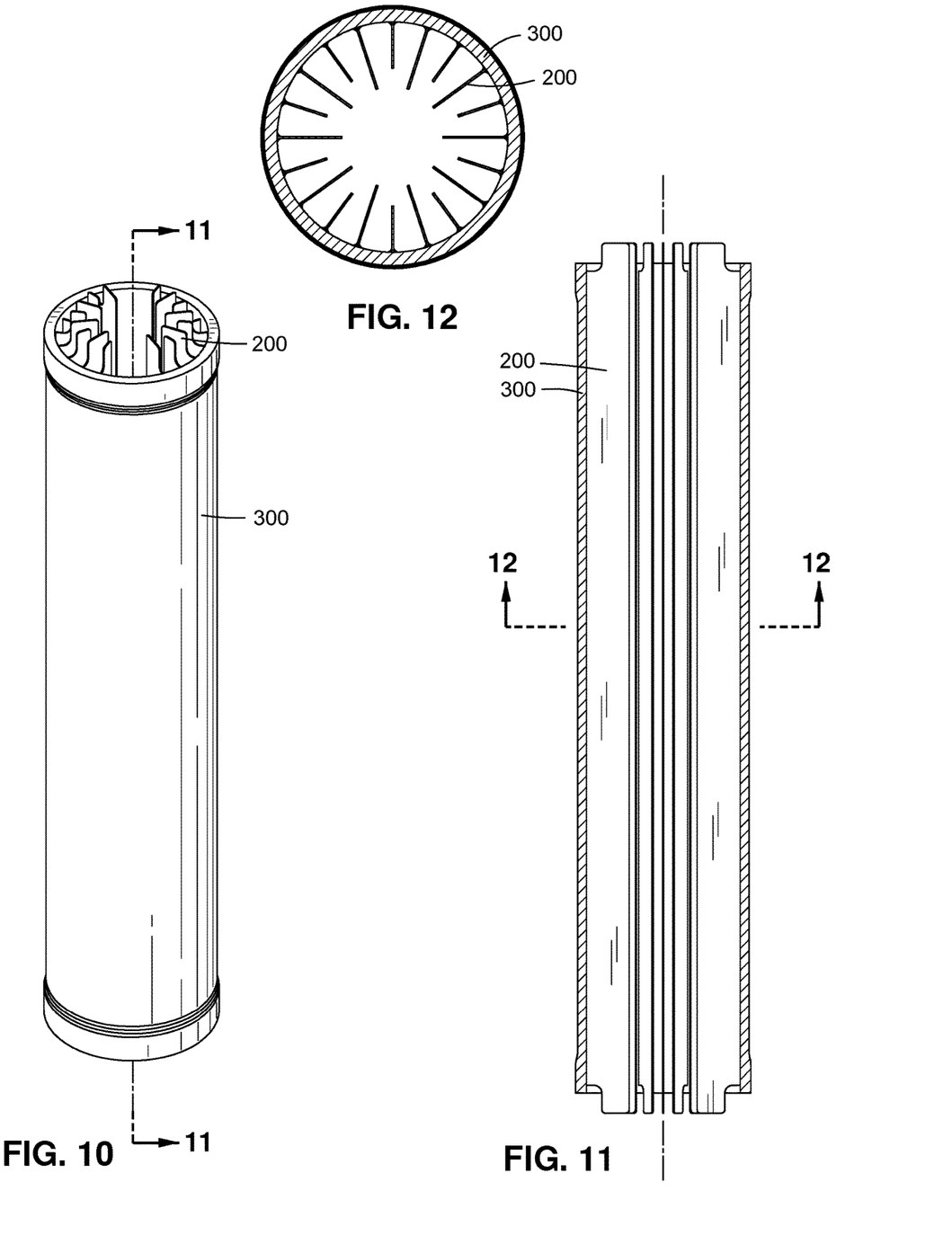
FIG. 10 is a perspective view of an internally finned pressure vessel made according to an embodiment of the present disclosure.
FIG. 11 is a cross-sectional view taken along line 11-11 in FIG. 10.
FIG. 12 is a cross-sectional view taken along line 12-12 in FIG. 11.

FIG. 10 is a perspective view of an internally finned pressure vessel 300 made according to an embodiment of the present disclosure. FIG. 11 is a cross-sectional view taken along line 11-11 in FIG. 10. FIG. 12 is a cross-sectional view taken along line 12-12 in FIG. 11. The internally finned pressure vessel 300, including the plurality of fins 200, may be made using the apparatus 100 having the brazing jig and tack welding jig described above, for example, by loading the plurality of fins 200 into slots 112 of the positioning discs 110, inserting the brazing jig into the pressure vessel 300, biasing the fins 200 against the interior wall of the pressure vessel 300 using the biasing discs 130 of the tack welding jig, leveling the fins 200 using the leveling disc 140 of the tack welding jig, tack welding the fins 200 to the pressure vessel 300, removing the tack welding jig, brazing the fins 200 to the pressure vessel 300, and removing the brazing jig. The internally finned pressure vessel 300 may be completed by closing the ends with a pair of end caps. For example, a pair of aluminum end caps may be welded to the pressure vessel 300, one on either side of the plurality of fins 200, resulting in a vessel 300 capable of sustaining high internal and external pressure while maximizing radial heat transport from the external environment to the contained working fluid. The apparatus 100 including the brazing jig and tack welding jig may then be reused in the fabrication of additional internally finned pressure vessels 300. In this regard, a new plurality of fins 200 may be loaded into the slots 112 of the positioning discs 110 and the remainder of the process may be repeated to attach the new plurality of fins 200 to a new pressure vessel 300.

In general, in a thermal energy conversion engine, heat transfer enhancement may be needed for both moving and stationary fluids, making a simple increase of the convective heat transfer coefficient by increasing the fluid velocity insufficient. Without convection, the heat transfer rate is controlled solely by the thermal resistance to conduction in the fluid and the solid material of the pressure vessel. The thermal resistance may be decreased by reducing the distance that energy must travel in the medium of low thermal conductivity and by increasing the interface area between fluid and solid material. Both measures can be achieved using extended surfaces such as fins. Heat transfer from such extended surfaces may be used to increase the rate of heat transfer without increasing the convection coefficient or the temperature differential between solid material and fluid. Unlike more typical constructions in which the fins of the pressure vessel are located externally and intended to increase the heat transfer rate from a solid with high thermal conductivity to air with very low thermal conductivity, the internally finned pressure vessel 300 made according to the present disclosure may improve the heat transfer rate from the exterior of a thermally conductive pressure vessel to a fluid of low thermal conductivity contained within. By using the disclosed apparatus 100, the difficulties associated with attaching fins to the interior of a pressure vessel may be overcome, allowing for the production of an internally finned pressure vessel 300 having high structural integrity with minimal weight and obstruction to fluid flow. Advantageously, the internally finned pressure vessel 300 produced by the disclosed embodiments and shown in FIGS. 10-12 does not create separate compartments within the pressure vessel 300 and therefore allows unobstructed radial flow in the cross-sectional plane of the pressure vessel 300. This may be important as certain working substances may exhibit substantial volumetric change when undergoing thermal expansion and/or phase change.

In U.S. Pat. No. 7,987,674, the disclosure of which is expressly incorporated herein by reference, a power generation system is described in which a Phase Change Material (PCM) working substance is melted (expanded) at warm temperatures, for example 15° C., and frozen (contracted) at cooler temperatures, for example 8° C. Tubes containing the PCM, which could be a paraffin such as pentadecane, would be equipped with a flexible center tube containing hydraulic oil. When the PCM is melted (expanded), it pushes the oil through a hydraulic motor to generate rotational mechanical energy which is then converted to electricity using common methods. The elapsed time during which the unit must remain at PCM freezing and melting temperatures is critical as it defines the amount of energy that can be generated in a specific timeframe. To keep the freeze and melt time low, previous units have been built with many small diameter tubes to minimize the distance energy has to be transferred through the PCM with low thermal conductivity. The disadvantage of this concept is the increased complexity of the system and the high overall system mass per unit of PCM volume. The disclosed apparatus 100 makes it possible to fabricate one large diameter tube 300 instead of many small ones while maintaining fast freeze and melt times. By the above-described processes, radially arranged thin aluminum fins 200 may be mechanically and thermally attached to the inside wall of the tube 300 to transport heat into the PCM.

In the illustrated examples described above, the pressure vessel 300 is assumed to be cylindrical. However, the disclosed subject matter is not intended to be so limited. For example, in the case of a spherical pressure vessel 300, the fins 200 may be thicker or curved outward in the middle and the positioning discs 110 may be larger toward the middle of the brazing jig. In such case, the relationship between the slot distances d1, d2 of the positioning discs 110 and biasing discs 120 (see FIG. 1) may be modified as needed to create the desired outward biasing while accounting for differences in the sizes of the positioning discs 110 and/or differences in the thicknesses of the fins 200.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of fabricating an internally finned pressure vessel, the method comprising:
    providing an apparatus including a plurality of positioning discs, each of the positioning discs defining a plurality of circumferentially spaced slots extending radially into the positioning disc from a perimeter thereof, the apparatus further including one or more rods extending through the plurality of positioning discs, the plurality of positioning discs being held in axial alignment by the one or more rods;
    loading a plurality of fins into the slots of the positioning discs;
    inserting the apparatus containing the plurality of fins into a pressure vessel;
    attaching the plurality of fins to the pressure vessel by a brazing process; and
    removing the apparatus from the pressure vessel.

2. The method of claim 1, wherein the positioning discs are made of stainless steel or a nickel-chromium based alloy.

3. The method of claim 1, wherein the fins are made of aluminum.

4. The method of claim 1, wherein the apparatus further includes a pair of biasing discs, one on either side of the plurality of positioning discs and held in axial alignment therewith by the one or more rods, each of the biasing discs defining a plurality of circumferentially spaced slots extending radially into the biasing disc from a perimeter thereof, the slots of the biasing discs terminating farther than the slots of the positioning discs from an axis defined by the axial alignment of the plurality of positioning discs, the method further comprising:
    tack welding the plurality of fins to the pressure vessel after said inserting; and,
    thereafter, removing the pair of biasing discs prior to said attaching.

5. The method of claim 4, wherein the biasing discs are made of rubber.

6. The method of claim 1, wherein the one or more rods comprise a center rod at an axis defined by the axial alignment of the plurality of positioning discs, the apparatus further including a pair of leveling discs, one on either side of the plurality of positioning discs and held in axial alignment therewith by the center rod, each of the leveling discs defining a surface that overlaps the slots of the positioning discs, the method further comprising:
    abutting the plurality of fins against the surface of a first leveling disc of the pair of leveling discs; and,
    while the fins are abutted against the surface of the first leveling disc, abutting the plurality of fins against the surface of a second leveling disc of the pair of leveling discs.

7. The method of claim 6, wherein said abutting the plurality of fins against the surface of the second leveling disc includes moving the second leveling disc along the axis relative to the center rod.

8. The method of claim 6, wherein the leveling discs are made of stainless steel.

9. The method of claim 1, further comprising welding a pair of end caps to the pressure vessel, one on either side of the plurality of fins.

10. The method of claim 9, wherein the end caps are made of aluminum.

11. A method of fabricating a plurality of internally finned pressure vessels, the method comprising:
    providing an apparatus including a plurality of positioning discs, each of the positioning discs defining a plurality of circumferentially spaced slots extending radially into the positioning disc from a perimeter thereof, the apparatus further including one or more rods extending through the plurality of positioning discs, the plurality of positioning discs being held in axial alignment by the one or more rods;
    loading a plurality of fins into the slots of the positioning discs;
    inserting the apparatus containing the plurality of fins into a pressure vessel;
    attaching the plurality of fins to the pressure vessel by a brazing process;
    removing the apparatus from the pressure vessel;
    loading a new plurality of fins into the slots of the positioning discs;
    inserting the apparatus containing the new plurality of fins into a new pressure vessel; and
    attaching the new plurality of fins to the new pressure vessel by a brazing process.

* * * * *